No. 39,432. J. STOCK. PHOTOGRAPHIC CAMERA. PATENTED AUG. 4, 1863.
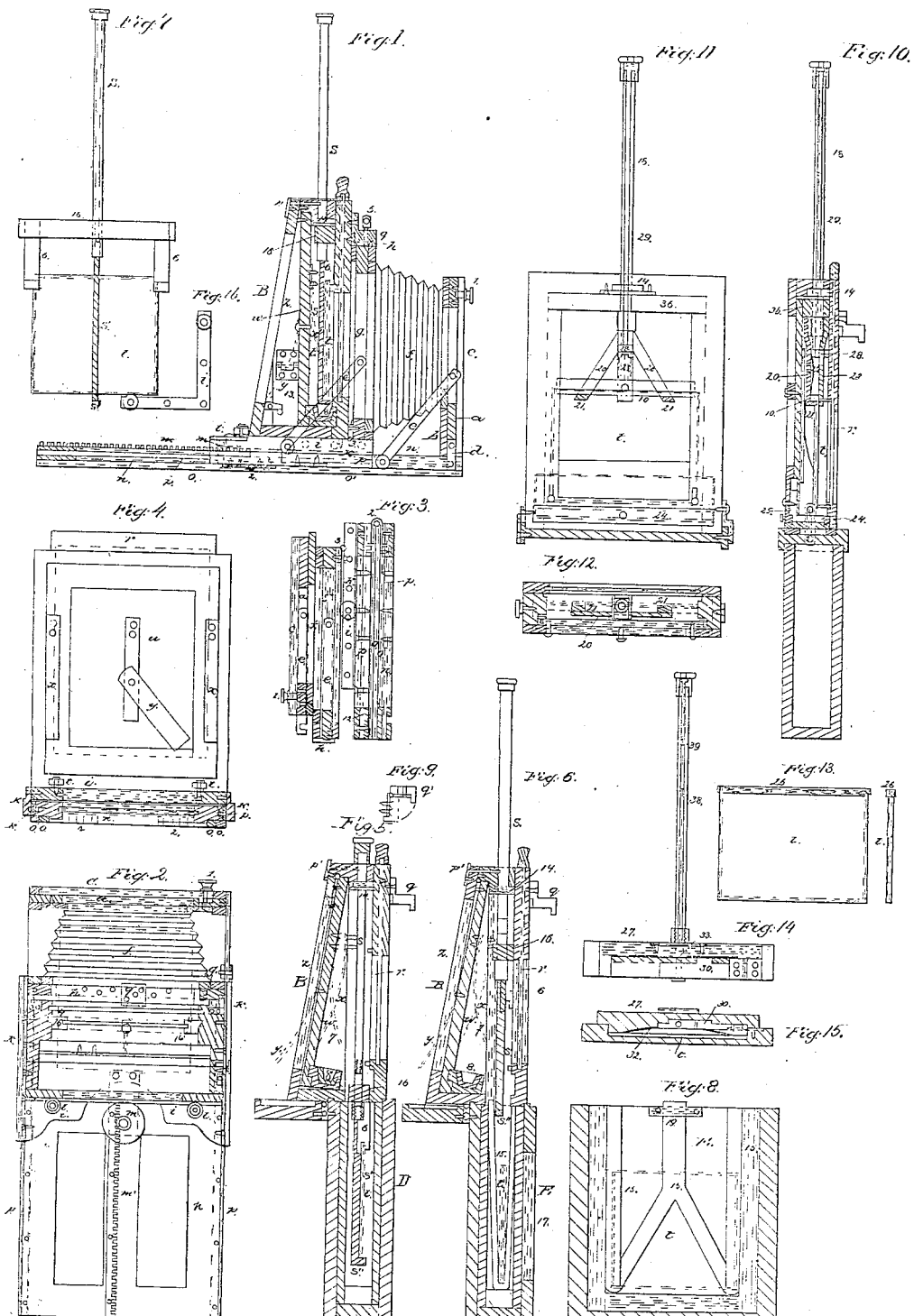

UNITED STATES PATENT OFFICE.

JOHN STOCK, OF NEW YORK, N. Y.

PHOTOGRAPHIC CAMERA.

Specification forming part of Letters Patent No. 39,432, dated August 4, 1863.

*To all whom it may concern:*

Be it known that I, JOHN STOCK, of the city of New York, in the county and State of New York, have invented a new and Improved Photographic Camera; and I do hereby declare that the following is a full and exact description of the same, reference being had to the accompanying drawings, and to the letters of reference marked thereon.

Figure I represents a longitudinal section of the improved camera with plate-holder. Fig. II represents a horizontal section or plan of the same. Fig. III represents the camera folded up for transportation. Fig. IV is an end view of the plate-holder. The other figures represent different views referred to in the description.

Similar letters represent similar parts.

The nature of this invention consists in the construction of a camera so arranged as to be readily folded together into a very small compass for the purpose of easy transportation, and, further, in the construction of the plate-holder in such a manner as to combine with the same the necessary baths required to prepare and complete the plates before and after the picture is taken, without the necessity of a dark room or place, so as to enable the taking of pictures with the wet process in any place and under all circumstances.

In the accompanying drawings, *a* represents the front side of the camera, to which a plate, *c*, is attached, containing the object-glass, capable of being moved upward or downward, and held in any desired position by means of the set-screw 1. This front *a* is connected with the foundation or bottom plate, *n*, through the tongue-piece *b*, fitted into a suitable groove in said bottom plate. By means of a hook, *d*, this front *a* is fastened to the bottom plate, *n*. The angular position of the same is secured through braces *e*. The foundation or bottom plate, *n*, is made in two pieces, jointed together by hinges 2, secured and attached on the under side, so that when said bottom plate is opened any fastening on either part will retain the same perfectly firm. Pieces or strips *o o'* are fastened on the under side in such a manner that when folded together the strips *o'* will come to lie on one side of the strips *o*. By means of these strips an even and smooth surface or foundation will be given to this bottom plate, *n*, when opened, as said strips fill up the space occupied by the projecting part of the hinges.

*g* is the back side of the camera, attached to the sliding bottom *i* by means of hinges 3, and held firmly in its position by braces *e'*, or any other suitably-shaped brace, such as represented in Fig. XVI.

*f* is the extension-bellows attached to the front side, *a*, and to the back side, *g*.

*i* is the sliding bottom, to which the back side, *g*, of the camera is attached, as above described. This sliding bottom is provided with side pieces, *k*, embracing the bottom plate, *n*, and arranged with grooves into which projections or tongues *p*, fast to the sides of the bottom plate, *n*, work, whereby this sliding bottom *i*, and consequently the after part of the camera, can easily be moved on the bottom plate, *n*, backward or forward. This motion is produced by means of a wheel, *m*, fast to the sliding bottom *i*, working into a suitable rack *m'*, fast to the bottom plate, *n*.

To fold the camera together, the sliding bottom *i* is moved upon the forward part of the bottom plate, *n;* the front side, *a*, is disconnected from the bottom plate, *n*, and brought up close to the back side, *g*, and together with the latter laid upon the sliding bottom *i*, and then the bottom plate, *n*, folded together, when the whole apparatus will occupy only a very small space, as represented in Fig. III.

B is the plate-holder. In the front part of the same a slide, *r*, is made in the usual manner. *w* is the back of the plate-holder, made movable either by being made quite loose, or secured by hinges or bands near the upper end to the inner side of the plate-holder. This back plate, *w*, is provided at the bottom, on its inner side, with a small trough, 8, made of any suitable material, for the purpose of collecting the fluid silver which may run off the glass plate after the same comes out of the silver-bath. This trough 8 when pushed inward with the back plate, *w*, covers up a hole in the bottom of a plate-holder directly under the glass plate, so as to prevent the admission of the light into the interior of the plate-holder.

*x x* are springs situated at the sides of the back *w*, and through which the back *w* of the plate-holder is pressed outward when required. *y* is a spring attached to the outside of the movable back *w*, whereby the same will be secured and fastened in its proper place. 7 is a spring fast on the inner side of the back plate, *w*, to press against the plate-glass so as to bring the same in its proper focus. The plate-holder B is made with an after part, *z*, to allow for the vibration of the back plate, *w*, and to prevent at the same time, by this arrangement, the admission of light into the interior of the holder when said back plate, *w*, is moved inward or outward. In one side of this after part *z* a small door, 13, is made for the purpose of taking out the trough 8 when desired.

On the top of the back side, *g*, of the camera a plate, *h*, is attached, provided with any desired number of holes regularly divided. A projection, *v*, is made on this plate, running parallel with the after face of the back side, *g*, of the camera. Near the top on the front face of the plate-holder a hook or its equivalent, *q*, is attached, fitting over this projection *v* of the plate *h* and capable of sliding on the same. By this described arrangement the plate-holder will be hung upon the back side of the camera, capable of sliding on the same, while the bottom of the plate-holder will be kept quite free from the bottom of the camera or from the sliding bottom *i* of the same, in consequence of which every irregularity or difficulty of an easy motion will be prevented, resulting from the swelling of the wood in the lower part of the plate-holder, and which produces so much annoyance by the present usual arrangement of sliding the plate-holder in grooves on the bottom of the camera-plate.

The plate *h*, upon which the plate-holder is hung and upon which the same slides, is provided with holes regularly divided and so arranged that any number of pictures which may be desired, and consequently likewise microscopic pictures, may be taken. In the hook *q* corresponding holes are made for this purpose, provided with a point or pin, 5, connecting the same with any one of the holes in said plate *h*, and as these holes are arranged so as to correspond with any desired number of pictures, this can thereby be easily obtained by moving the plate holder from one hole to the other. The hook or block *q* may likewise be made with a hinge, as represented at *q′*, Fig. IX, to facilitate the packing together of the holder. Through to top of the plate-holder a rod *s*, is arranged capable of working up and down. This rod is provided with a groove, into which a spring-point, *p′*, passing through the back of the plate-holder (or arranged in any other suitable way) is made to fit, and whereby the rod *s* is prevented from turning. In the inner side of the plate-holder a piece of felt, 14, or any other suitable material, is arranged, through which the rod *s* is made to work, and whereby the light is prevented entering the interior of the plate-holder. On the lower part of the rod *s* a cross-frame, 16, is attached to said rod, working in suitable grooves, 4 4, made on the inner side of the plate-holder, and whereby the same is guided. On the extreme end of the rod *s* a rod, *s′*, is firmly attached to the same, provided at its end with a nose, *s″*. The frame 16 has on each side projections 6 6, downward, which are provided with suitable recesses or grooves to receive the upper corners of the glass plate *t*, while the bottom of the glass plate rests upon the nose or projection *s″* at the end of the rod *s′*. (See Figs. I, V, and VII.) By this arrangement the glass plate will be held perfectly secure, and may be easily moved upward or downward. To detach the glass plate *t* the spring pin *p′* is moved out of the groove in the rod *s*, when said rod may be turned around. By turning this rod *s* the rod *s′*, which, as above described, is firmly attached to the same, will likewise be turned, whereby its projecting nose *s″* will likewise turn and be moved away from under the glass plate *t*, when the latter will be at liberty, and can fall out of its hold or fastening.

In Fig. V the plate-holder B is represented attached to the silver-bath D. After the plate-holder is fixed upon the silver-bath, the back plate, *w*, is made loose by disconnecting the spring *y*, when the action of the springs *x* will push the same, together with the trough 8, outward. By this outward motion of the back *w* and trough 8 the glass plate *t* will be relieved from the action of the spring 7, and at the same time the hole in the bottom of the plate-holder opened so as to form a communication between the inside of the plate-holder B and the silver-bath D sufficiently large for the glass plate *t* to pass through. The rods *s* and *s′*, together with the frame 16, which, as above described, hold the glass plate *t*, are then moved down into the silver-bath D, so as to prepare the plate *t*. When this process of preparing the plate *t* is completed, the said plate is drawn up again into the plate-holder B, the back plate, *w*, is pushed back again into its place and secured by the spring *y*, whereby the glass plate will be brought into its proper focus, and the opening or hole in the bottom of the plate-holder will be closed, so as to prevent the admission of light to the interior of the plate-holder. The silver-bath D is then removed and the plate-holder B is hung into its place on the back of the camera upon the plate *h*, as above described, when by removing the slide *r* the process of taking the picture may proceed.

The manner of hanging the plate-holder upon the camera, as described, will generally insure a close fit between the front surface of the plate-holder and the back of the plate *g*, or the back of the camera, but to keep the plate-holder with greater certainty always tight against the back of this plate *g*, small friction-rollers *l*, or their equivalent, are secured to the sliding bottom *i*, which press said plate-holder against the surface. When the picture has been taken, the plate-holder B is again removed from the camera and fixed upon the developing-bath E, as represented in Fig. VI. The back plate, *w*, is then again loosened, whereby the opening in the bottom of the plate-holder is uncovered, as above described, and consequently a communication formed between the inside of the plate-holder B and the developing bath E. The glass plate $t$ is then moved downward until within a short distance of the top of the bath E, when the pin $p'$ is removed out of the groove in the rod $s$, and said rod $s$ turned around, whereby, as above described, the nose $s''$, upon which the glass-plate $t$ rests, is removed from the under side of said glass plate $t$, when the same will fall into this developing-bath E. In the front of this bath E a yellow glass plate, 17, is inserted, through which the picture can be seen and the developing process be examined. In the bath a frame, 15, is situated, (see Figs. VI and VIII,) into which the glass plate $t$ falls from the plate-holder, and by means of which the glass plate $t$ is afterward lifted out of the bath. This frame 15 moves in a guide, 19, attached to the inside of the bath. The silver-bath D, as well as the developing-bath E, are made with water-tight covers, either hinged on, as shown in the drawings, or the same may be made with sliding covers. The upper ends of these baths must be made in such a manner as to fit to the bottom of the plate-holder B, to exclude any light.

Instead of securing and operating the glass plate $t$ as above described, the same may be made as represented in Figs. X, XI, and XII, where a hollow rod, 18, is arranged to work through the top of the plate-holder, to the bottom of which a cross-frame, 36, working in grooves to guide the same, as above described, is fastened. To the lower end of this hollow rod 18, toward the back side of the plate-holder, a frame, with two or more arms, 20, is securely fastened, having at their ends projections or noses 21. Toward the front side of the plate-holder a flexible rod or bar, 23, is attached to the lower end of this rod 18, pressing toward the arms 20, which latter are provided with a small spring, 22. Through the hollow rod 18 a rod, 29, is made to move, having at its lower end a projection, 28, which latter, when pressed downward, acts upon the flexible bar 23, so as to press the same away from the arms 20. The glass plate $t$ is in this case provided with projection 10, fastened on the same, or an india-rubber band, 26, Fig. XIII, may be fastened to the top of the glass plate, forming a projection. The projection 10 or the projection formed by the band 26 support the glass plate $t$ upon the projections 21 of the arms 20, while the flexible rod 23, acting against the other side of the glass plate, hold the same in its place and fast against the action of the spring 22. By this arrangement the glass-plate will be held securely fast, and may be moved upward or downward, as may be desired. When it is required to disengage said glass plate, the internal rod, 29, is pushed downward, when the projection 28 on its lower end will act upon the arm or flexible bar 23, forcing the same away from the glass plate $t$, when the action of the spring 22 will push said glass plate off from the projections 21, and thus allow said glass plate to fall downward. The glass plate $t$ may likewise be held and moved as desired by an arrangement, as represented in Figs. XIV and XV, where the cross-frame 27, which is attached to the lower end of the hollow rod 38, is provided with a hinged tongue, 30, in combination with a spring, 32, which holds the glass plate perfectly secure near its upper end without the necessity of attaching a projecting ledge or india-rubber band to the same. When the glass plate requires to be let loose, so as to fall out of the plate-holder, the internal rod, 39, passing through the hollow rod 38, is pressed down, and acts then upon a pin or bolt, 33, whereby the tongue 30 is opened, and the glass plate be at liberty to fall.

Instead of attaching the back plate, $w$, of the plate-holder by bands or hinges to the plate-holder, and attaching a trough to its inner lower end to close the opening in the bottom of the plate holder, as above described, the said back plate may be made in the usual manner loose, as shown in Fig. X. The trough 24, which closes up the opening in the bottom of the plate-holder, through which the glass plate has to pass, may be made similar to a drawer. (See Figs. X and XI.) A piece of felt, 25, or any similar soft and flexible substance, is in that case fitted into the back frame of the plate-holder, and projecting downward into the bottom of this trough 24, by which arrangement, when this trough 24 is pulled out, so as to uncover the hole in the bottom of the plate-holder, the admission of light will be excluded from the interior of the plate-holder. This flexible packing-piece 25 is attached by pins working in long slots, whereby the same can be lifted up clear out of the trough 24 when the same requires to be removed out of the plate-holder for the purpose of emptying the collected fluid.

Having now fully described my invention, I hereby declare that I claim as my invention and desire to secure by Letters Patent—

1. Attaching the front part, $a$, of a camera to the movable bottom plate, $n$, by means of a tongue-piece, $b$, fitted into a suitable groove and secured by a hook, $d$, and brace, $e$.

2. Attaching the after part, $g$, of the camera to the sliding bottom $i$ by means of hinges 3, and secured by suitable braces.

3. Attaching the hinges 2 for the purpose of folding the bottom plate, $n$, on the under side of said plate, in combination with the strips $o$ and $o'$, arranged as described, and for the purpose set forth.

4. The strips $p$ $p$, attached to the sides of the bottom plate, $n$, acting in the side pieces, $k$, of the sliding bottom $i$.

5. The movable back plate, $w$, of the plate-holder, together with its springs $x$, $y$, and 7, and in combination with the extended after part, $z$, of the plate-holder, when arranged and operating in the manner and for the purpose substantially as set forth.

6. The trough 8, attached to the inside of the back plate, $w$, for the purpose of receiving the drippings of the glass plate, as well as to close the opening in the bottom of the plate-holder.

7. Hanging the plate-holder on the top of the after part, $g$, of the camera by means of a suitable hook, $q$, in combination with a slide-plate, $h$, attached to the after part, $g$, of the camera, said plate $h$ having regular divisions, through which, in connection with the pin 5, or its equivalent, the plate-holder can be regularly moved, so that any desired number of pictures may be taken.

8. The arrangement and combination of the frame 16, rod $s'$ with nose $s''$ to hold the glass plate $t$, in connection with the rod $s$ to operate the same, and the manner of liberating the glass plate, substantially as described.

9. The arrangement of the packing 14, through which the rod $s$ works, for the purpose described.

10. The arrangement and use of the frame 15, with its guide 19, in a developing-bath, for the purpose described.

JOHN STOCK.

Witnesses:
HENRY E. ROEDER,
ROBERT J. SAVAGE.